(12) United States Patent
Blanchard et al.

(10) Patent No.: US 9,709,998 B2
(45) Date of Patent: Jul. 18, 2017

(54) PRESSURE REGULATOR (71) Applicant: Marshall Excelsior Co., Marshall, MI (US)

(72) Inventors: Frederick W. Blanchard, Battle Creek, MI (US); James C. Zuck, Marshall, MI (US)

(73) Assignee: MARSHALL EXCELSIOR CO., Marshall, MI (US)

(*) Notice: Subject to any disclaimer, the term of this patent is extended or adjusted under 35 U.S.C. 154(b) by 83 days.

(21) Appl. No.: 14/207,774

(22) Filed: Mar. 13, 2014

(65) Prior Publication Data

US 2014/0261787 A1   Sep. 18, 2014

Related U.S. Application Data (60) Provisional application No. 61/782,081, filed on Mar. 14, 2013.

(51) Int. Cl.
*G05D 11/00* (2006.01)
*G05D 16/06* (2006.01)

(52) U.S. Cl.
CPC ..... *G05D 16/0683* (2013.01); *G05D 16/0602* (2013.01); *G05D 16/0608* (2013.01); *Y10T 137/261* (2015.04); *Y10T 137/7793* (2015.04); *Y10T 137/783* (2015.04)

(58) Field of Classification Search
CPC .................. Y10T 137/261; Y10T 137/783
USPC .............................. 251/243, 77–83
See application file for complete search history.

(56) References Cited

U.S. PATENT DOCUMENTS

| | | | |
|---|---|---|---|
| 1,540,439 | A | 6/1925 | Thrall |
| 1,546,047 | A | 7/1925 | Thrall |
| 2,052,246 | A | 8/1936 | Thrall |
| 2,442,156 | A | 5/1948 | White |

(Continued)

FOREIGN PATENT DOCUMENTS

| | | |
|---|---|---|
| DE | 689 14 708 T2 | 11/1994 |
| DE | 696 06 525 T2 | 7/2000 |

(Continued)

OTHER PUBLICATIONS

MacMillan Dictionary, "Adjacent", Jul. 2016.*

(Continued)

*Primary Examiner* — R. K. Arundale
(74) *Attorney, Agent, or Firm* — Howard & Howard Attorneys PLLC (57) ABSTRACT

A pressure regulator includes a housing having an upper housing portion and a lower housing portion, the lower housing portion defining an annular recess and the upper housing portion having a bottom surface, an annular protrusion extending from the bottom surface, a diaphragm disposed between the upper housing portion and the lower housing portion, the diaphragm including an outer lip having a first thickness, a flexible connecting section connected to the outer lip and having a second thickness smaller than the first thickness, and an annular inner section connected to the flexible connecting section, the outer lip having a bottom surface disposed in the annular recess and a top surface, and the protrusion being pressed into the top surface so that the outer lip seals between the upper housing portion and the lower housing portion.

16 Claims, 7 Drawing Sheets

(56) References Cited

U.S. PATENT DOCUMENTS

| | | | |
|---|---|---|---|
| 2,694,410 A | 11/1954 | Ey | |
| 3,032,054 A | 5/1962 | Irwin | |
| 3,042,064 A | 7/1962 | Pommerseim | |
| 3,160,169 A | 12/1964 | Peterson | |
| 3,339,581 A * | 9/1967 | Courtot | 137/505.46 |
| 3,411,522 A * | 11/1968 | Golden et al. | 137/116.5 |
| 3,768,503 A | 10/1973 | Billington | |
| 3,890,999 A | 6/1975 | Moskow | |
| 3,991,785 A | 11/1976 | Trinkwalder, Jr. | |
| 4,152,848 A | 5/1979 | Trinkwalder | |
| 4,226,257 A | 10/1980 | Trinkwalder | |
| D258,075 S | 1/1981 | Mann | |
| 4,269,215 A | 5/1981 | Odar | |
| 4,295,489 A | 10/1981 | Arends et al. | |
| 4,356,820 A | 11/1982 | Trinkwalder, Jr. | |
| 4,491,149 A | 1/1985 | Trinkwalder | |
| 4,619,436 A | 10/1986 | Bonzer et al. | |
| 4,624,442 A | 11/1986 | Duffy et al. | |
| 4,669,761 A | 6/1987 | Huling | |
| 4,754,778 A | 7/1988 | Duffy et al. | |
| 4,782,850 A | 11/1988 | Duffy et al. | |
| 4,842,013 A | 6/1989 | Rice et al. | |
| 4,889,158 A | 12/1989 | Rice et al. | |
| 4,972,868 A | 11/1990 | Davis et al. | |
| 4,972,871 A | 11/1990 | Rice et al. | |
| 5,062,449 A | 11/1991 | Woollums et al. | |
| 5,271,601 A | 12/1993 | Bonzer et al. | |
| 5,388,865 A | 2/1995 | Hawkins | |
| 5,402,820 A | 4/1995 | Duffy et al. | |
| D362,297 S | 9/1995 | Lee | |
| D362,298 S | 9/1995 | Lee | |
| D362,488 S | 9/1995 | Lee | |
| D362,712 S | 9/1995 | Lee | |
| D363,761 S | 10/1995 | Eggleston et al. | |
| 5,582,201 A | 12/1996 | Lee et al. | |
| D379,845 S | 6/1997 | Lee | |
| 5,662,100 A | 9/1997 | Fox et al. | |
| 5,697,398 A | 12/1997 | Gidney et al. | |
| 5,709,369 A | 1/1998 | Hawkins et al. | |
| 5,735,306 A | 4/1998 | Olds et al. | |
| 5,739,434 A | 4/1998 | Jensen | |
| 5,740,833 A | 4/1998 | Olds et al. | |
| 5,769,122 A | 6/1998 | Baumann et al. | |
| 5,816,286 A | 10/1998 | Scott et al. | |
| D403,050 S | 12/1998 | Schlick | |
| 5,881,765 A | 3/1999 | Turney et al. | |
| 5,941,281 A | 8/1999 | Baumann et al. | |
| 5,964,446 A | 10/1999 | Walton et al. | |
| 5,970,977 A | 10/1999 | Sattelberg | |
| 5,996,617 A | 12/1999 | Olds et al. | |
| 6,026,859 A | 2/2000 | Wears et al. | |
| 6,035,878 A | 3/2000 | Adams et al. | |
| 6,056,008 A | 5/2000 | Adams et al. | |
| 6,095,196 A | 8/2000 | McCarty et al. | |
| 6,102,071 A | 8/2000 | Walton et al. | |
| 6,178,997 B1 | 1/2001 | Adams et al. | |
| 6,213,150 B1 | 4/2001 | Gethmann | |
| 6,223,769 B1 | 5/2001 | Bragg et al. | |
| 6,244,297 B1 | 6/2001 | Baumann | |
| 6,371,156 B1 | 4/2002 | Walton et al. | |
| 6,382,253 B1 | 5/2002 | McCarty et al. | |
| 6,416,268 B2 | 7/2002 | Gethmann | |
| 6,441,744 B1 | 8/2002 | Adams et al. | |
| D464,582 S | 10/2002 | Pepperling et al. | |
| 6,536,469 B2 | 3/2003 | Dilger et al. | |
| 6,539,315 B1 | 3/2003 | Adams et al. | |
| 6,668,855 B2 | 12/2003 | Heald et al. | |
| 6,672,331 B2 | 1/2004 | Heald et al. | |
| 6,701,957 B2 | 3/2004 | McCarty et al. | |
| 6,830,061 B2 | 12/2004 | Adams et al. | |
| 6,895,351 B2 | 5/2005 | Grumstrup et al. | |
| 6,903,659 B2 | 6/2005 | Vanderah et al. | |
| 6,935,370 B2 | 8/2005 | McCarty et al. | |
| 6,948,519 B2 | 9/2005 | Cavagna | |
| 6,953,182 B2 | 10/2005 | Lovell et al. | |
| 6,957,661 B1 | 10/2005 | Borton et al. | |
| 6,968,857 B2 | 11/2005 | Hawkins et al. | |
| 6,971,403 B2 | 12/2005 | Heald et al. | |
| 7,013,918 B2 | 3/2006 | McCarty et al. | |
| 7,049,975 B2 | 5/2006 | Vanderah et al. | |
| 7,064,671 B2 | 6/2006 | Vanderah et al. | |
| 7,261,119 B2 | 8/2007 | Olds | |
| 7,318,447 B2 | 1/2008 | Law | |
| 7,320,340 B2 | 1/2008 | Bush et al. | |
| 7,328,718 B2 | 2/2008 | Olds et al. | |
| 7,578,314 B2 | 8/2009 | McCarty et al. | |
| D607,355 S | 1/2010 | Horner et al. | |
| D616,067 S | 5/2010 | Cavagna | |
| 7,766,045 B2 | 8/2010 | Fagerlund et al. | |
| D623,272 S | 9/2010 | Cavagna | |
| D623,273 S | 9/2010 | Cavagna | |
| D623,274 S | 9/2010 | Cavagna | |
| 7,802,592 B2 | 9/2010 | McCarty | |
| 7,828,009 B2 | 11/2010 | Neumann et al. | |
| 7,896,028 B2 | 3/2011 | Weyer, Jr. et al. | |
| 2004/0007270 A1 | 1/2004 | Olds | |
| 2004/0040600 A1 | 3/2004 | Cavagna | |
| 2004/0261855 A1 | 12/2004 | Hart et al. | |
| 2006/0096643 A1 | 5/2006 | McCarty et al. | |
| 2006/0185736 A1 | 8/2006 | Cavagna | |
| 2007/0075287 A1 | 4/2007 | Lechner | |
| 2007/0272313 A1 | 11/2007 | Olds | |
| 2008/0053535 A1 | 3/2008 | Leggitt | |
| 2008/0078460 A1 | 4/2008 | Roper et al. | |
| 2008/0257418 A1 | 10/2008 | Kranz et al. | |
| 2008/0257421 A1 | 10/2008 | Kranz | |
| 2008/0257423 A1 | 10/2008 | Quijano | |
| 2008/0257424 A1 | 10/2008 | Quijano | |
| 2008/0257427 A1 | 10/2008 | Zhang et al. | |
| 2008/0258095 A1 | 10/2008 | Hawkins et al. | |
| 2008/0258096 A1 | 10/2008 | Hawkins | |
| 2008/0258097 A1 | 10/2008 | Griffin et al. | |
| 2008/0258098 A1 * | 10/2008 | Hawkins | F16K 31/165 251/366 |
| 2008/0258099 A1 | 10/2008 | Hawkins | |
| 2009/0065073 A1 | 3/2009 | Davis | |
| 2009/0260697 A1 | 10/2009 | Mevius et al. | |
| 2009/0261281 A1 | 10/2009 | Mevius et al. | |
| 2009/0288718 A1 | 11/2009 | Jablonski | |
| 2009/0309059 A1 | 12/2009 | McCarty et al. | |
| 2009/0314360 A1 | 12/2009 | Checiches et al. | |
| 2010/0025603 A1 | 2/2010 | Burlage et al. | |
| 2010/0051117 A1 | 3/2010 | Lin et al. | |
| 2010/0071786 A1 | 3/2010 | Hawkins et al. | |
| 2010/0243080 A1 | 9/2010 | Zecchi et al. | |
| 2010/0243081 A1 | 9/2010 | Zecchi et al. | |
| 2010/0269925 A1 | 10/2010 | Roper et al. | |
| 2010/0270490 A1 | 10/2010 | Roper et al. | |
| 2010/0289258 A1 | 11/2010 | Cavagna | |
| 2010/0313971 A1 | 12/2010 | Moore et al. | |
| 2010/0319799 A1 | 12/2010 | McCarty | |

FOREIGN PATENT DOCUMENTS

| | | |
|---|---|---|
| DE | 696 12 879 T2 | 3/2002 |
| DE | 600 05 840 T2 | 7/2004 |
| DE | 698 20 653 T2 | 9/2004 |
| DE | 699 18 949 T2 | 7/2005 |
| DE | 601 10 836 T2 | 3/2006 |
| DE | 698 30 565 T2 | 5/2006 |
| DE | 698 32 400 T2 | 7/2006 |
| DE | 600 28 742 T2 | 5/2007 |
| DE | 600 29 326 T2 | 7/2007 |
| DE | 602 21 105 T2 | 3/2008 |
| EP | 0 229 005 B1 | 4/1989 |
| EP | 0 192 625 B1 | 5/1989 |
| EP | 0 398 858 A2 | 11/1990 |
| EP | 0 331 665 B1 | 4/1994 |
| EP | 0 581 287 B1 | 6/1997 |
| EP | 0 817 990 B1 | 2/2000 |
| EP | 0 949 553 B1 | 5/2001 |
| EP | 0 934 559 B1 | 1/2002 |
| EP | 0 880 733 B1 | 3/2002 |
| EP | 0 920 657 B1 | 11/2002 |

(56) References Cited

FOREIGN PATENT DOCUMENTS

| | | |
|---|---|---|
| EP | 1 198 740 B1 | 10/2003 |
| EP | 1 015 950 B1 | 12/2003 |
| EP | 1 049 893 B1 | 7/2004 |
| EP | 1 354 252 B1 | 5/2005 |
| EP | 0 958 466 B1 | 6/2005 |
| EP | 1 562 095 A2 | 8/2005 |
| EP | 1 017 950 B1 | 11/2005 |
| EP | 1 165 992 B1 | 6/2006 |
| EP | 1 441 273 B1 | 6/2006 |
| EP | 1 196 834 B1 | 7/2006 |
| EP | 1 396 774 B1 | 7/2006 |
| EP | 1 698 815 A1 | 9/2006 |
| EP | 1 519 253 A3 | 1/2007 |
| EP | 1 366 392 B1 | 7/2007 |
| EP | 1 020 779 B1 | 10/2007 |
| EP | 1 857 905 A1 | 11/2007 |
| EP | 0 994 291 B1 | 2/2008 |
| EP | 1 362 201 B1 | 10/2008 |
| EP | 1 709 501 B1 | 1/2009 |
| EP | 1 566 585 B1 | 6/2009 |
| EP | 1 735 557 B1 | 9/2009 |
| EP | 1 999 530 B1 | 5/2010 |
| EP | 1 943 446 B1 | 10/2010 |
| EP | 2 278 426 A1 | 1/2011 |
| EP | 2 278 427 A1 | 1/2011 |
| EP | 1 809 551 B1 | 2/2011 |
| EP | 1 428 088 B1 | 4/2011 |
| WO | WO 9630817 A1 | 10/1996 |
| WO | WO 97 07445 A2 | 2/1997 |
| WO | WO 97 17641 A1 | 5/1997 |
| WO | WO 97 37162 A1 | 10/1997 |
| WO | WO 98 08150 A1 | 2/1998 |
| WO | WO 98 18069 A1 | 4/1998 |
| WO | WO 98 34057 A1 | 8/1998 |
| WO | WO 99 15823 A1 | 4/1999 |
| WO | WO 99 15942 A1 | 4/1999 |
| WO | WO 99 39122 A1 | 8/1999 |
| WO | WO 00 57091 A1 | 9/2000 |
| WO | WO 00 70253 A1 | 11/2000 |
| WO | WO 01 01214 A1 | 1/2001 |
| WO | WO 01 01215 A1 | 1/2001 |
| WO | WO 01 16523 A1 | 3/2001 |
| WO | WO 02 05049 A1 | 1/2002 |
| WO | WO 02 10625 A1 | 2/2002 |
| WO | WO 02 057861 A1 | 7/2002 |
| WO | WO 02 063403 A2 | 8/2002 |
| WO | WO 02 066875 A1 | 8/2002 |
| WO | WO 02 071165 A2 | 9/2002 |
| WO | WO 02 088861 A1 | 11/2002 |
| WO | WO 03 073189 A1 | 9/2003 |
| WO | WO 2004 053612 A1 | 6/2004 |
| WO | WO 2004 077187 A1 | 9/2004 |
| WO | WO 2004 088444 A2 | 10/2004 |
| WO | WO 2005 003876 A1 | 1/2005 |
| WO | WO 2005 073821 A1 | 8/2005 |
| WO | WO 2005 103542 A1 | 11/2005 |
| WO | WO 2007 106374 A2 | 9/2007 |
| WO | WO 2007 126863 A1 | 11/2007 |
| WO | WO 2007 132128 A1 | 11/2007 |
| WO | WO 2008 016430 A1 | 2/2008 |
| WO | WO 2008 018953 A2 | 2/2008 |
| WO | WO 2008 042665 A1 | 4/2008 |
| WO | WO 2008 130849 A1 | 10/2008 |
| WO | WO 2008 131110 A2 | 10/2008 |
| WO | WO 2008 131235 A1 | 10/2008 |
| WO | WO 2008 131237 A1 | 10/2008 |
| WO | WO 2008 131246 A1 | 10/2008 |
| WO | WO 2008 131248 A1 | 10/2008 |
| WO | WO 2008 131250 A1 | 10/2008 |
| WO | WO 2008 131254 A1 | 10/2008 |
| WO | WO 2008 131255 A1 | 10/2008 |
| WO | WO 2008 134246 A2 | 11/2008 |
| WO | WO 2009 035864 A2 | 3/2009 |
| WO | WO 2009 132007 A2 | 10/2009 |
| WO | WO 20091 32006 A1 | 10/2009 |
| WO | WO 2009 142861 A2 | 11/2009 |
| WO | WO 2010 008676 A2 | 1/2010 |
| WO | WO 2010 014291 A1 | 2/2010 |
| WO | WO 2010 047848 A2 | 4/2010 |
| WO | WO 2010 065254 A1 | 6/2010 |
| WO | WO 2010 077472 A2 | 7/2010 |
| WO | WO 2010 126762 A1 | 11/2010 |
| WO | WO 2010 126809 A1 | 11/2010 |

OTHER PUBLICATIONS

NGVI North America, Regulators N-LPR Vapor Regulator Description & Dimensions, catalog, pp. 8-9, dated prior to Mar. 14, 2013; 2 pages.

Sherwood LPG Products, LPG Regulator, Apr. 2007; 16 pages.

Cramer Decker Propane Equipment, Regulators First and Second Stage Residential Sherwood Regulators, pp. 4-12, dated prior to Mar. 14, 2013; 9 pages.

REGO, LP-Gas & Anhydrous Ammonia Equipment, Section A Regulators and Accessories, catalog, pp. A1-A36, Elon, North Carolina, USA, 37 pages.

English language abstract for DE 689 14 708 extracted from the www.espacenet.com database on Apr. 15, 2014.

English language abstract for DE 696 06 525 extracted from the www.espacenet.com database on Apr. 15, 2014.

English language abstract for DE 696 12 879 extracted from the www.espacenet.com database on Apr. 15, 2014.

English language abstract for DE 698 20 653 extracted from the www.espacenet.com database on Apr. 15, 2014.

English language abstract for DE 698 30 565 extracted from the www.espacenet.com database on Apr. 15, 2014.

English language abstract for DE 698 32 400 extracted from the www.espacenet.com database on Apr. 15, 2014.

English language abstract for DE 699 18 949 extracted from the www.espacenet.com database on Apr. 15, 2014.

English language abstract and machine-assisted English translation for EP 1 698 815 extracted from the www.espacenet.com database on Apr. 15, 2014.

English language abstract and machine-assisted English translation for EP 1 857 905 extracted from the www.espacenet.com database on Apr. 15, 2014.

English language abstract and machine-assisted English translation for WO 2007 132128 extracted from the www.espacenet.com database on Apr. 15, 2014.

\* cited by examiner

PRESSURE REGULATOR

CROSS-REFERENCE TO RELATED APPLICATION(S)

The present invention claims priority to and the benefit of co-pending U.S. Provisional Patent Application Ser. No. 61/782,081, filed Mar. 14, 2013, which is hereby incorporated by reference in its entirety.

BACKGROUND OF THE INVENTION

1. Field of the Invention

The present invention relates generally to pressure regulators and, more particularly to, a pressure regulator including a diaphragm.

2. Description of the Related Art

Pressure regulators are configured to produce a desired output pressure of a fluid from an input pressure of the fluid. Often, pressure regulators are configured to reduce the input pressure so that the output pressure is substantially less than the input pressure.

Single stage and dual stage pressure regulators are available to reduce the input pressure. Single stage regulators are often employed to regulate fluid pressure in gas appliances such as gas grills. Dual stage pressure regulators are often employed for regulating fluid pressure of natural gas or propane in domestic fluid systems. For instance, one dual stage pressure regulator has a first stage that reduces the fluid pressure from a storage tank, such as a propane storage tank, to around 10 psi, while a second stage reduces the 10 psi input to around 11 inches water column output pressure. Some regulations require the output pressure not to exceed 2 psi.

Typically, pressure regulators include a housing formed of upper and lower housing portions that are connected together with fasteners and a diaphragm located between the upper and lower housing portions. An outer periphery of the diaphragm often has a lip shaped to fit inside an annular recess in the lower housing portion to help seal between the upper and lower housing portions. However, such lips are subject to leakage. Thus, there is a need in the art for improved sealing between upper and lower housing portions of a pressure regulator.

Generally, the diaphragm of the pressure regulator is shaped to have an inner annular section configured to raise and lower during operation of the pressure regulator. The diaphragm has a flexible connecting section radially extending between the inner annular section and the outer lip. The flexible connecting section has a thickness less than a thickness of the inner annular section and the lip. A diaphragm plate is positioned on top of the inner annular section to provide additional rigidity to the inner annular section as the inner annular section raises and lowers during operation. In some commercial products, the diaphragm plate is loosely located on the inner annular section, which can result in shifting of the diaphragm plate with respect to the inner annular section and potentially cause problems with operation. In other commercial products, the diaphragm plate is insert-molded into the diaphragm to prevent shifting of the diaphragm plate, but this process can be expensive. Thus, there remains a need in the art for a pressure regulator with an improved diaphragm plate that prevents shifting relative to the diaphragm without requiring insert-molding.

In some conventional pressure regulators, projections on the lower housing portion suspend a bottom surface of the inner annular section of the diaphragm above an inner surface of the lower housing portion to reduce contact between the bottom surface and the lower housing portion. However, there still remains some contact between the bottom surface and the projections, which can result in damage to the diaphragm prior to operation. Thus, there is a need in the art for a diaphragm of a pressure regulator in which the bottom surface is completely suspended in the housing without contacting any portions of the housing.

Generally, the pressure regulator includes a valve body disposed in the lower housing portion and is slidable among a plurality of operational positions. Typically, a valve disc is retained by the valve body. The valve disc is configured to engage a valve seat surrounding a fluid passageway when the valve body is in a closed position. When the valve disc and valve body are spaced from the valve seat, fluid passes through the passageway into a pressure chamber of the lower housing portion. A lever operatively couples the diaphragm with the valve body. When the input pressure pushes the valve disc and valve body away from the valve seat to allow fluid to pass through the passageway, pressure in the pressure chamber increases, and the diaphragm rises. As the diaphragm rises, the lever pivots about a pivot point and urges the valve body and valve disc back toward the valve seat. This reduces the amount of fluid that passes through the passageway and reduces the pressure in the pressure chamber. This back and forth action results in pressure regulation by regulating fluid flow through the passageway, around the valve body, and into the pressure chamber. When the fluid flows around the valve body, the valve body tends to vibrate or hum. Thus, there is a need in the art to reduce such vibrations or humming

SUMMARY OF THE INVENTION

Accordingly, the present invention provides a pressure regulator including a housing having an upper housing portion and a lower housing portion. The lower housing portion defines an annular recess and the upper housing portion has a bottom surface and an annular protrusion extending from the bottom surface. The pressure regulator also includes a diaphragm disposed between the upper housing portion and the lower housing portion and including an outer lip having a first thickness, a flexible connecting section connected to the outer lip and having a second thickness smaller than the first thickness, and an annular inner section connected to the flexible connecting section. The outer lip has a bottom surface disposed in the annular recess and a top surface. The protrusion is pressed into the top surface so that the outer lip seals between the upper housing portion and the lower housing portion.

The present invention also provides a pressure regulator including a housing having upper and lower housing portions and a diaphragm including an outer lip captured between the upper and lower housing portions, a flexible connecting section connected to the outer lip, and an annular inner section connected to the flexible connecting section and having a first locating feature. The pressure regulator also includes a diaphragm plate having a second locating feature shaped to interface with the first locating feature to radially secure the diaphragm plate to the annular inner section of the diaphragm.

The present invention further provides a pressure regulator including a housing having an upper housing portion and a lower housing portion and defining an inlet and an outlet. The lower housing portion includes a plurality of protrusions. The pressure regulator includes a diaphragm having an annular inner section, a flexible connecting section connected to the annular inner section, and an outer lip connected to the flexible connecting section and captured between the upper housing portion and the lower housing portion. The diaphragm defines a central bore. The pressure regulator includes a relief valve having a shaft disposed through the central bore and a head disposed between the diaphragm and the protrusions. The head is configured to suspend the annular inner section of the diaphragm in the housing above a lower chamber surface when no pressurized fluid is present at the inlet.

In addition, the present invention provides a pressure regulator including a housing having upper and lower housing portions defining an inlet and an outlet, the housing defining a valve seat surrounding a passageway in communication with the inlet. The pressure regulator also includes a diaphragm captured between the upper and lower housing portions to define upper and lower pressure chambers and a valve body disposed in the passageway and movable between a plurality of operational positions including an open position spaced from the valve seat and a closed position in contact with the valve seat. The valve body includes a pocket and a spring disposed in the pocket. The pressure regulator further includes a lever operatively coupling the diaphragm to the valve body and a driving pin being non-fixedly located in a recess of the valve body and the valve body being pivoted about the driving pin by the spring to provide an off-axis force against the valve body.

One advantage of the present invention is that the pressure regulator includes a protrusion to compress a lip of a diaphragm into a recess to better seal between upper and lower housing portions of a housing. Another advantage of the present invention is that the pressure regulator includes a diaphragm and a diaphragm plate including locating features to secure the diaphragm plate to the diaphragm to prevent shifting of the diaphragm plate relative to an annular inner section of the diaphragm. Yet another advantage of the present invention is that the pressure regulator includes protrusions and a relief valve to prevent abrasion or wear of the diaphragm prior to use. Still another advantage of the present invention is that the pressure regulator includes a mechanism to reduce noise, vibrations, or humming of the valve body when the fluid flows around the valve body.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
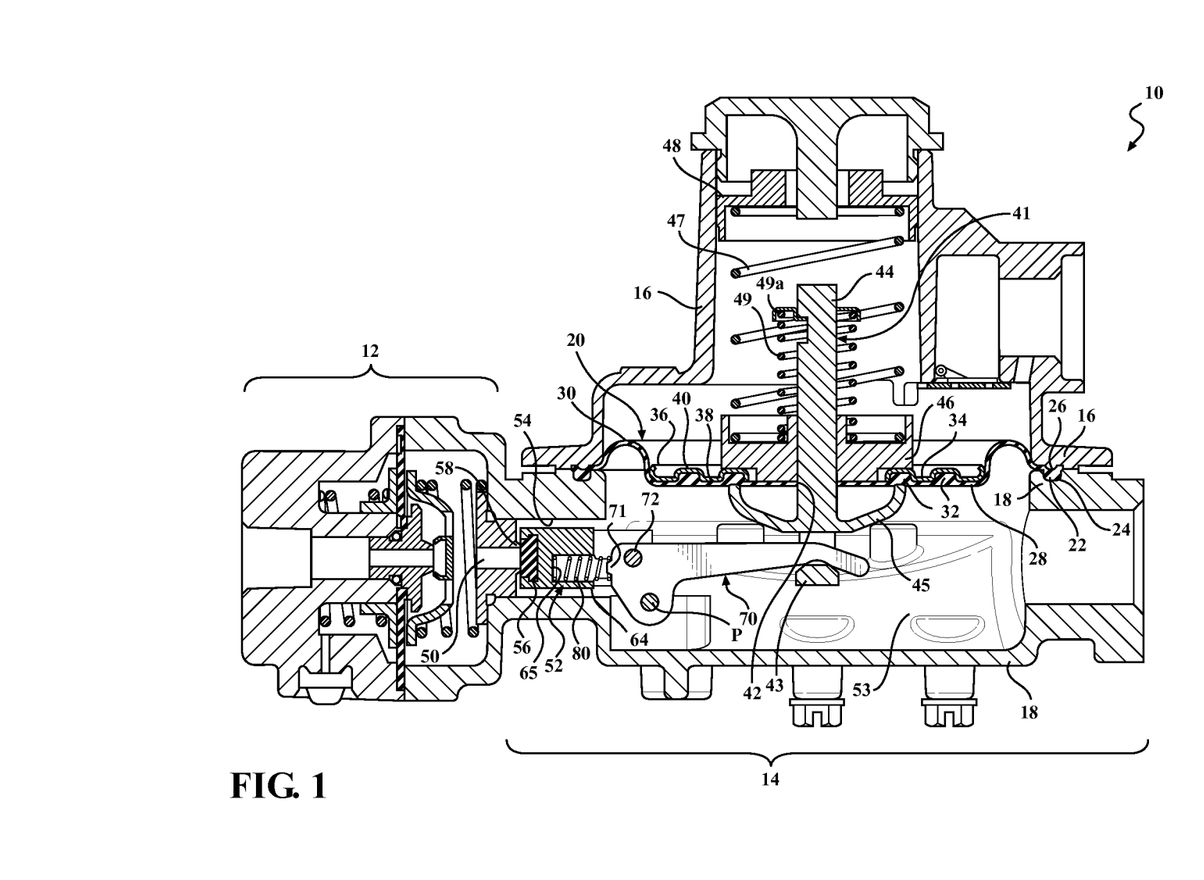
FIG. 1 is a sectional view of one embodiment of a pressure regulator, according to the present invention.

Referring to the drawings and in particular FIG. 1, one embodiment of a pressure regulator 10, according to the present invention, is shown. The pressure regulator 10 is configured to produce a desired output pressure of a fluid from an input pressure of the fluid. In the embodiment illustrated, the pressure regulator 10 is configured to reduce the input pressure so that the output pressure is substantially less than the input pressure.

In the embodiment illustrated, the pressure regulator 10 is a dual-stage pressure regulator having a first stage 12, which is conventional in the art and will not be described in detail. Dual stage pressure regulators are sometimes employed for regulating the pressure of natural gas or propane in domestic fluid systems, although other uses are possible. In some embodiments, the first stage 12 reduces the pressure of fluid from a storage tank, such as a propane storage tank (not shown), to about 10 psi. Thus, about 10 psi is the input pressure for a second stage 14 of the pressure regulator 10. The second stage 14 is configured to reduce the input pressure from the first stage 12. In some embodiments, the second stage 14 reduces the approximately 10 psi input pressure to about 11 inches water column output pressure. Some regulations require the output pressure not to exceed 2 psi. It should be appreciated that the specific pressure set points of the pressure regulator 10 are not intended to limit the present invention.

The pressure regulator 10 includes a housing formed of an upper housing portion 16 and a lower housing portion 18 that are connected together with fasteners (not shown). The housing portions 16, 18 may be formed of metal. The pressure regulator 10 also includes a ring-shaped diaphragm, generally indicated at 20, having an outer periphery or lip 22 that is captured between the housing portions 16, 18. The lower housing portion 18 has an annular and U-shaped recess 24 sized and shaped to receive a bottom section of the outer lip 22. The upper housing portion 16 has an annular protrusion 26 configured to contact an upper surface of the outer lip 22. The protrusion 26 is formed as an arcuate and annular bump on a bottom surface of the upper housing portion 16. In some embodiments, the protrusion 26 is generally "V" shaped in cross-section.

Figure 2A:
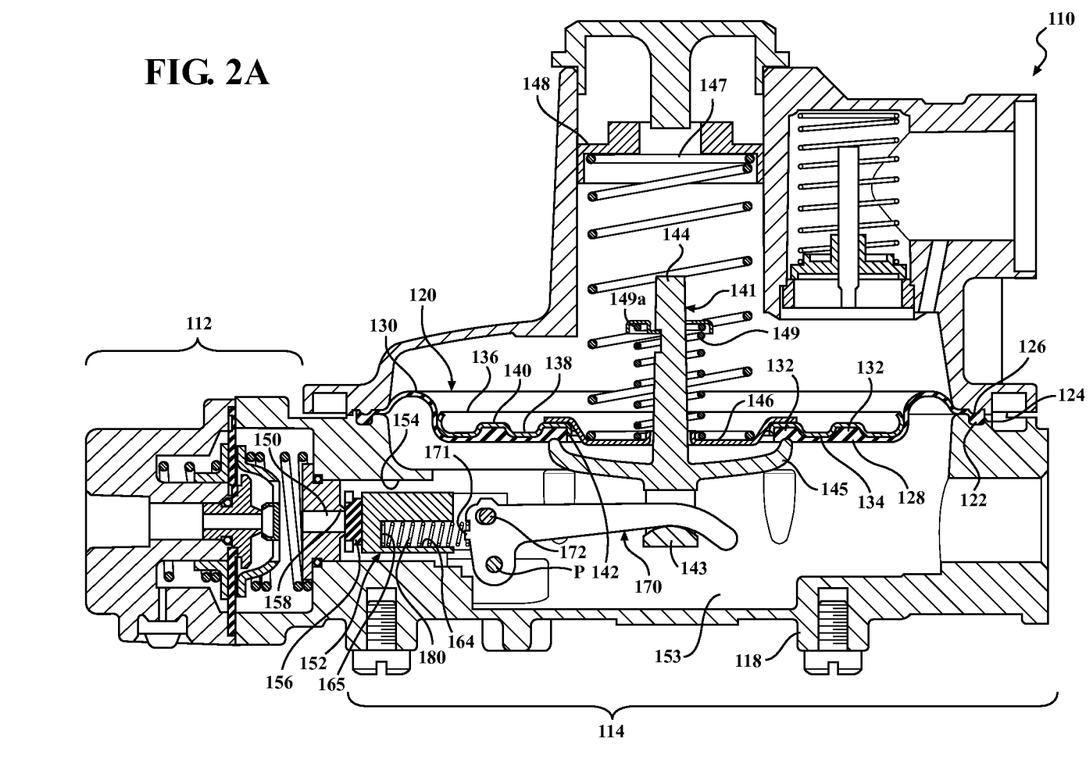
FIG. 2A is a sectional view of another embodiment, according to the present invention, of the pressure regulator of FIG. 1.
Figure 2B:
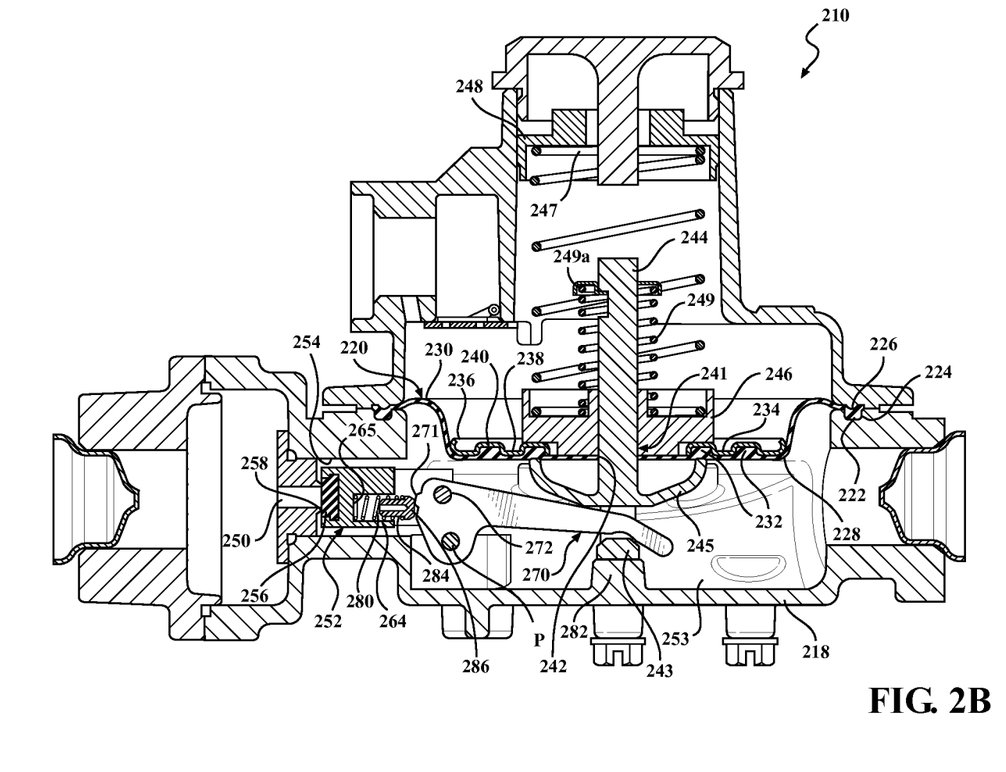
FIG. 2B is a sectional view of yet another embodiment, according to the present invention, of the pressure regulator of FIG. 1.

The diaphragm 20 further includes an annular inner section 28 and a flexible connecting section 30 radially connecting the outer lip 22 and the annular inner section 28. In one embodiment, the flexible connecting section 30 is generally annular. The outer lip 22 has a first thickness and the flexible connecting section 30 has a second thickness less than the first thickness, making the flexible connecting section 30 flexible to allow raising and lowering of the annular inner section 28 within the housing. The annular inner section 28 has at least one, preferably a plurality of locating features formed in an upper surface thereof. The locating features shown in FIGS. 1 and 2 include alternating annular ridges 32 and grooves 34. In the embodiment illustrated, two ridges 32 and two grooves 34 are shown. The diaphragm 20 is made of a flexible material. The diaphragm 20 is integral, unitary, and one-piece.

The pressure regulator 10 includes a ring-shaped diaphragm plate 36 engaging the diaphragm 20. The diaphragm plate 36 is preferably formed as a separate rigid piece configured to be seated on the diaphragm 20 without being rigidly connected to the diaphragm 20. In some embodiments, however, the diaphragm plate 36 may be rigidly connected to the diaphragm 20. The diaphragm plate 36 is formed with at least one, preferably a plurality of locating features (in some cases stamped in the plate 36 when the plate 36 is metal or molded into the plate 36 when the plate 36 is plastic). The locating features of the diaphragm plate 36 are shaped to co-locate with the locating features of the diaphragm 20 to radially lock the diaphragm plate 36 to the diaphragm 20. In the embodiment illustrated, the locating features of the diaphragm plate 36 include alternating ridges 38 and grooves 40 shaped to mate with the grooves 34 and ridges 32 of the annular inner section 28, respectively, of the diaphragm 20. It should be appreciated that, when aligned to one another, the diaphragm plate 36 substantially covers an upper surface of the annular inner section 28 of the diaphragm 20. It should also be appreciated that the locating features prevent shifting of the diaphragm plate 36 laterally or radially relative to the diaphragm 20.

The pressure regulator 10 also includes a relief valve, generally indicated at 41. The diaphragm 20 and diaphragm plate 36 define a central bore 42 to receive the relief valve 41. The relief valve 41 includes a yoke 43 and a shaft or stem 44 extending axially from the yoke 43. The central bore 43 receives the stem 44 of the yoke 43. The relief valve 41 also includes a head 45 having an outer periphery sized to extend beyond the diameter of the central bore 43 and contact a bottom surface of the annular inner section 28. This contact seals against fluid flow between the head 44 and the annular inner section 28 under certain conditions. The pressure regulator 10 includes a spring retainer 46 disposed about the stem 44. The stem 44 is slidably received in the spring retainer 46. The pressure regulator 10 also includes a regulator spring 47 and a relief spring 49 disposed about the stem 44 and contacting the spring retainer 46, which supports the regulator spring 47 and the relief spring 49. The pressure regulator 10 further includes a relief spring retainer 49*a* disposed about the stem 44 and contacting the other end of the relief spring 49. It should be appreciated that, as pressure increases in a lower pressure chamber 53, separation may occur between the head 45 and the annular inner section 28 to relieve pressure in the lower pressure chamber 53, which is conventional in the art.

The pressure regulator 10 also includes a valve body, generally indicated at 52, located in a passageway 54 defined in the lower housing portion 18 that leads from an inlet 50 to a lower pressure chamber 53 defined in the housing. The valve body 52 is slidable in the passageway 54 among a plurality of operational positions. The pressure regulator 10 further includes a disc-shaped valve 56 carried by the valve body 52. The valve 56 is fixed to the valve body 52 to move with the valve body 52. The pressure regulator 10 also includes a valve seat 58 shaped for engagement by the valve 56 when the valve 56 is in a closed position thereby preventing the flow of fluid from the inlet 50 to the passageway 54. When the valve 56 and valve body 52 are spaced from the valve seat 58, fluid is allowed to flow from the inlet 50 through the passageway 54 and into the lower pressure chamber 46. The valve body 52 is formed of metal, but may be formed of other materials.

Referring to FIGS. 3-8, the valve body 52 includes a plurality of radially-extending spacers 60 that centrally align the valve body 52 in the passageway 54. The spacers 60 are spaced circumferentially and also provide pathways in the passageway 54 between the valve body 52 and the lower housing portion 18 through which the fluid can move from the inlet 50 to the lower pressure chamber 46. The valve body 52 also includes a pair of retainer tangs 62 that hold the valve 56 in position. The valve body 52 further includes an elongated spring pocket 64 defined therein having an inner surface 65.

Figure 9:
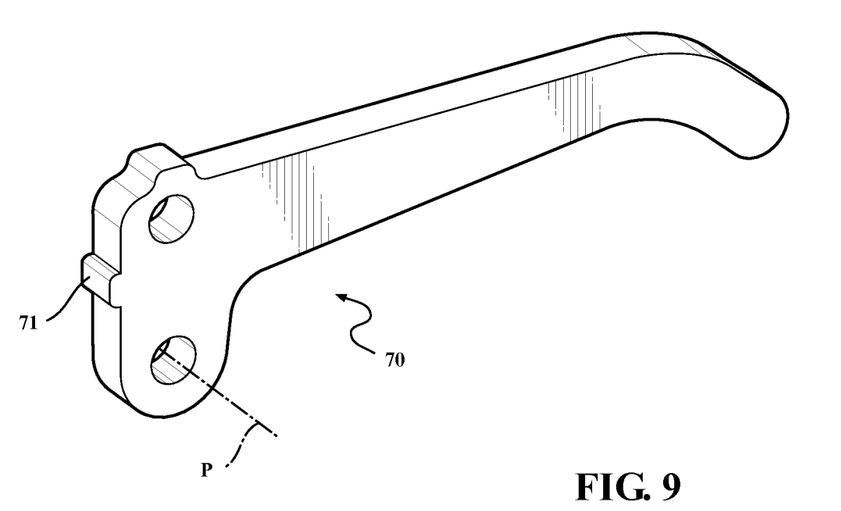
FIG. 9 is a perspective view of a lever of the pressure regulators of FIGS. 1 through 2B.

The pressure regulator 10 also includes a lever, generally indicated at 70, pivotally supported about pivot axis P in the lower housing portion 18. The lever 70 has a projection 71 at one end and the other end of the lever 70 is captured in the yoke 43 so that as the yoke 43 rises, the end of the lever 70 also rises. The pressure regulator 10 includes a driving pin 72 fixed to the lever 70 at a second end of the lever 70. The driving pin 72 is sized to fit within a recess 74 defined in the valve body 52. The valve body 52 includes a surface 73 that defines the recess 74 and an elongated slot 76. The lever 70 has a thickness sized to fit within the slot 76 in the valve body 52 for movement in the slot 76. When the lever 70 pivots counterclockwise about pivot axis P, such as when the diaphragm 20 and yoke 41 are rising in the housing formed by the upper and lower housing portions 16, 18, the driving pin 72 contacts the surface 73 defining the recess 74 to urge the valve body 52 toward the valve seat 58. When pressure on the valve 56 pushes the valve body 52 away from the valve seat 58, the surface 71 presses against the driving pin 72 to pivot the lever 70 clockwise.

The pressure regulator 10 also includes a vibration dampener assisting in preventing vibration and/or humming of the valve body 52 in the passageway 54. In the embodiment illustrated, the vibration dampener is a spring 80 located in the spring pocket 64. The spring 80 may be a compression spring. The spring 80 has one end that abuts the inner surface 65 of the valve body 52 and an opposing end engaged by the projection 71 on the lever 70. The spring pocket 64 is located offset from a central axis A (FIG. 6) of the valve body 52. In the embodiment illustrated, the entire spring pocket 64 is spaced radially from the axis A such that the axis A does not pass through any of the spring pocket 64. Owing to the driving pin 72 being non-fixedly located in the recess 74 and the offset location of the spring 80, the valve body 52 is pivoted about the driving pin 72 by the spring 80 to provide an off-axis force against the valve body 52. In particular, the force is applied transverse to the axis A. One component of this force is applied perpendicularly to the axis A. This perpendicular component of the force presses the spacers 60 of the valve body 52 against an outer surface of the passageway 54 to reduce vibration or humming of the valve body 52 in the passageway 54. Owing to tolerances of the passageway 54 to allow free sliding of the valve body 52 in the passageway 54, there may be gaps between radially outer surfaces of the spacers 60 and the inner surface forming the passageway 54, which can result in vibration or humming of the valve body 52 in the passageway 54 when fluid under pressure is flowing around the valve body 52. The perpendicular component of force presses the valve body 52 to reduce this vibration or humming.

Figure 2C:
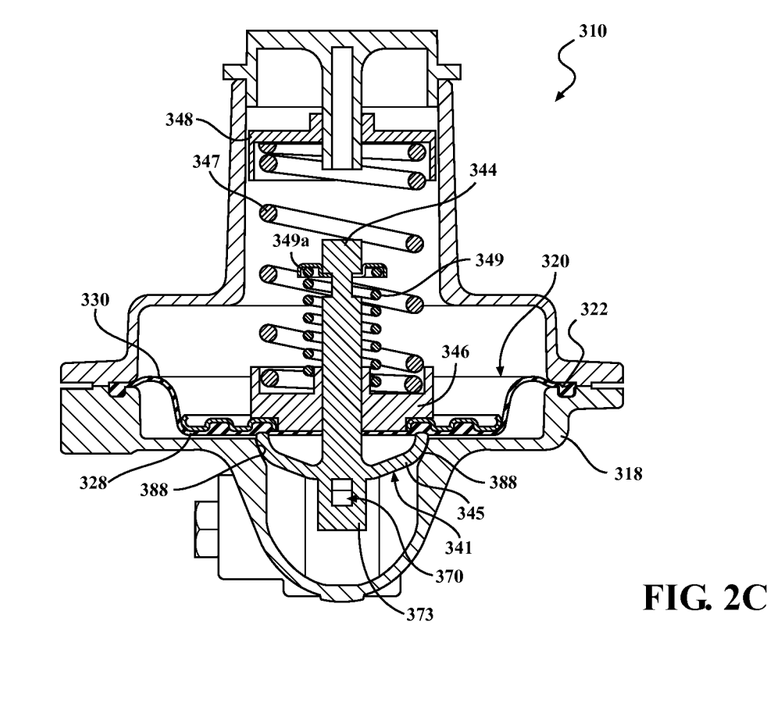
FIG. 2C is a sectional view illustrating a structure to suspend a diaphragm in a housing of the pressure regulator of FIG. 2B.
Figure 3:
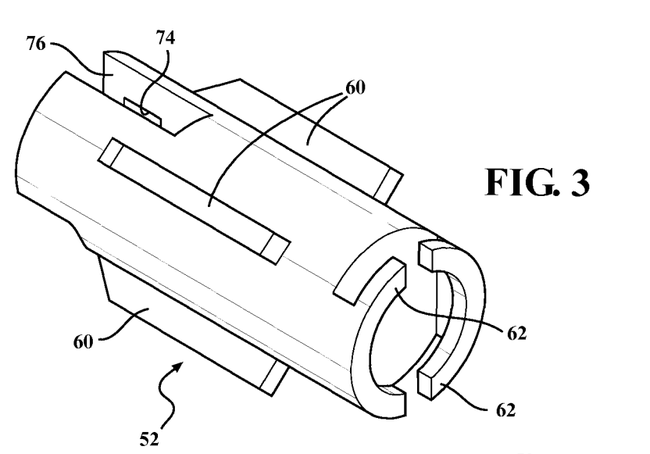
FIG. 3 is a perspective view of a valve body of the pressure regulators of FIGS. 1 through 2B.
Figure 4:
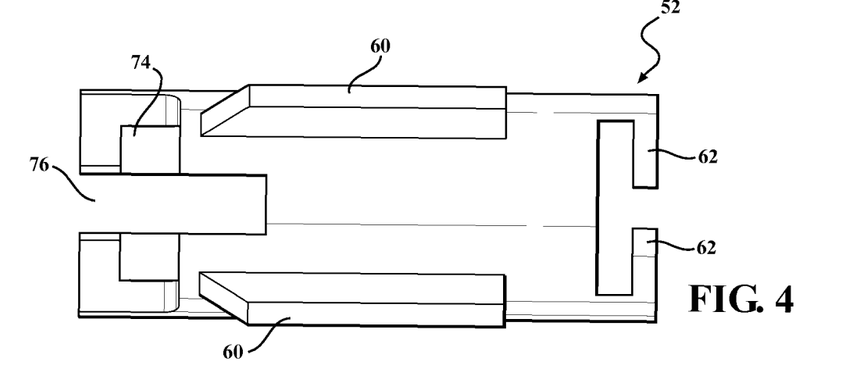
FIG. 4 is a bottom view of the valve body of FIG. 3.
Figure 5:
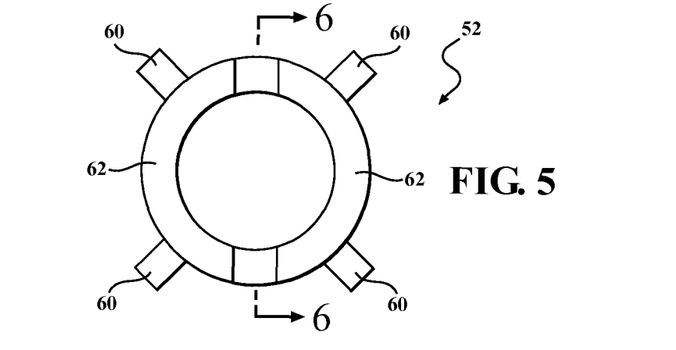
FIG. 5 is a front view of the valve body of FIG. 3.
Figure 6:
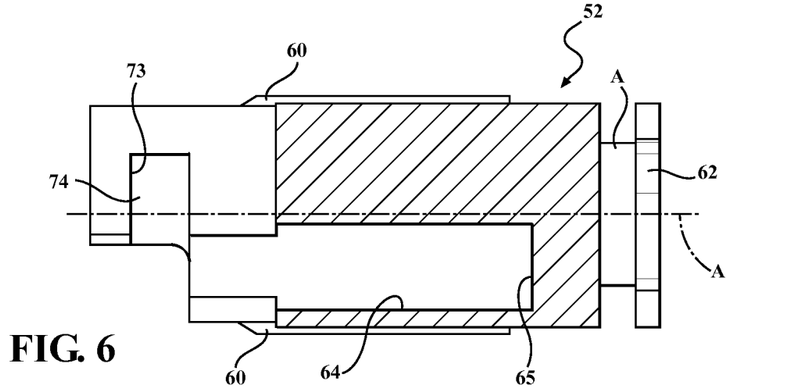
FIG. 6 is a sectional view taken along line 6-6 of FIG. 5.
Figure 7:
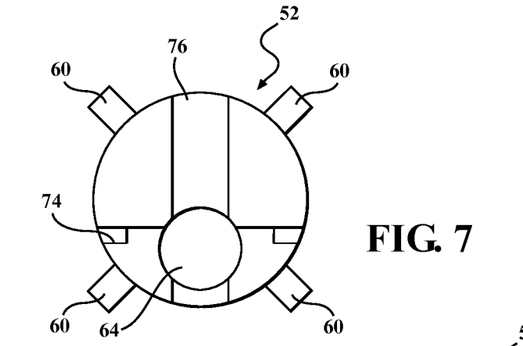
FIG. 7 is a rear view of the valve body of FIG. 3.
Figure 8:
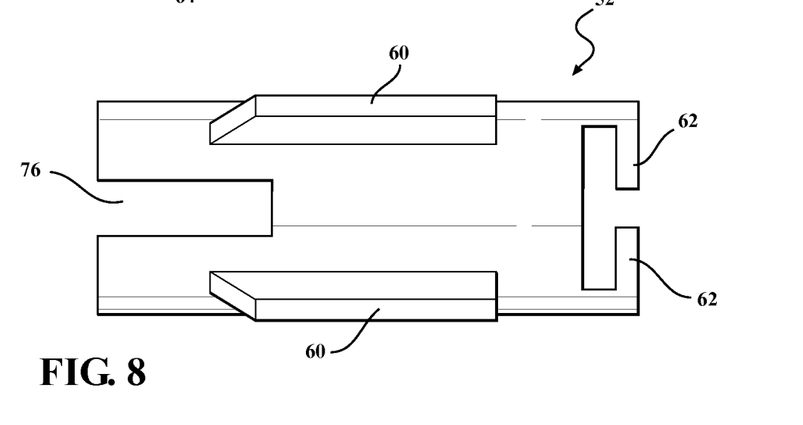
FIG. 8 is a top view of the valve body of FIG. 3.

Alternative embodiments 110, 210, 310 of the pressure regulator 10 are shown in FIGS. 2A through 2C. In FIG. 2A, numerals are increased by 100 to refer to the same or similar parts described above for the pressure regulator 10. For instance, the diaphragm 20 in FIG. 1 is referenced as diaphragm 120 in FIG. 2A. In FIG. 2B, numerals are increased by 200 to refer to the same or similar parts described above for the pressure regulator 10. For instance, the diaphragm 20 in FIG. 1 is the diaphragm 220 in FIG. 2B. In FIG. 2C, numerals are increased by 300 to refer to the same or similar parts described above for the pressure regulator 10. For instance, the diaphragm 20 in FIG. 1 is the diaphragm 320 in FIG. 2C. It should be appreciated that any features shown in the embodiments of FIGS. 2A, 2B, 2C can be combined with the other features described above with reference to FIG. 1.

Referring to FIG. 2B, the pressure regulator 210 includes a support 282 (also referred to as a boss) is integrally formed with the lower housing portion 218. As shown, the support 282 contacts a bottom surface of the yoke 243 when the pressure regulator 210 is at rest, i.e., before any fluid enters through the inlet 250. The regulator spring 247 is set to control the output pressure by a threaded spring adjuster 248 (basically threads and unthreads to set spring compression). At rest, the regulator spring 247 pushes the yoke 243 against the support 282. The outer periphery of the head 245, by virtue of contact with the annular inner section 228 of the diaphragm 220, and the yoke 243 by contacting the support 282 prevents the annular inner section 228 from contacting the support 282 or any other portion of the housing. At rest, as shown in FIG. 2B, the diaphragm 220 only contacts the housing at the outer lip 222. The annular inner section 228 and the flexible connecting section 230 are suspended in the housing without any direct contact with the housing. It should be appreciated that this prevents premature abrasion or wear of the diaphragm 220 associated with rubbing against the housing and readies the diaphragm 220 for use.

In FIG. 2B, an alternative arrangement of the vibration dampener is shown. In FIG. 2B, the pressure regulator 210 includes a plunger 284 having a first end positioned inside the spring 280 located in spring pocket 264. The spring 280 has one end that abuts the inner surface 265 of the valve body 252. The plunger 284 has a head 286 and an opposing end of the spring 280 is engaged by the head 286 of the plunger 265. It should also be appreciated that the head 286 is engaged by the projection 271 on the lever 270.

Referring to FIG. 2C, the lower housing portion 318 defines a plurality of arcuate recesses that act as support surfaces 388 integrally formed with the lower housing portion 318. As shown, the support surfaces 388 contact a bottom surface of the head 345 of the relief valve 341 when the pressure regulator 310 is at rest, i.e., before any fluid enters through the inlet. The regulator spring 347 is set to control the output pressure by the threaded spring adjuster 348 (basically threads and unthreads to set spring compression). At rest, the regulator spring 347 pushes the head 345 against the support surfaces 388. The outer periphery of the head 345, by virtue of contact with the annular inner section 328, and by contacting the support surfaces 388 prevents the annular inner section 328 from contacting the any other portion of the housing. As shown in FIG. 2C, at rest, the diaphragm 320 only contacts the housing at the outer lip 322. The annular inner section 328 and the flexible connecting section 330 are suspended in the housing without any direct contact with the housing. It should be appreciated that this prevents premature abrasion or wear of the diaphragm 320 associated with rubbing against the housing and readies the diaphragm 320 for use.

Embodiments of the present invention have been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A pressure regulator comprising:
   a housing having an upper housing portion and a lower housing portion, said lower housing portion defining an annular and U-shaped cross-section recess and an annular first shoulder spaced radially from said annular recess, said upper housing portion having a bottom surface and an annular protrusion extending from said bottom surface and an annular second shoulder spaced radially from said annular protrusion and aligned with said annular first shoulder;
   a diaphragm disposed between said upper housing portion and said lower housing portion and including an outer lip having a first thickness, a flexible connecting section connected to said outer lip and having a second thickness smaller than said first thickness, and an annular inner section connected to said flexible connecting section; and
   wherein said outer lip is rectangular in shape and has a bottom surface disposed in said annular recess and a top surface, said protrusion being pressed into said top surface so that said outer lip seals between said upper housing portion and said lower housing portion and said annular second shoulder of said upper housing portion and said annular first shoulder of said lower housing portion directly contact each other adjacent said outer lip.

2. A pressure regulator as set forth in claim 1 wherein said protrusion is formed as an arcuate bump on said bottom surface of said upper housing portion.

3. A pressure regulator comprising:
   a housing having upper and lower housing portions;
   a diaphragm including an outer lip captured between said upper and lower housing portions, a flexible connecting section connected to said outer lip, and an annular inner section connected to said flexible connecting section, said annular inner section having a first locating feature including a plurality of first alternating ridges and grooves spaced radially;
   a diaphragm plate having a second locating feature including a plurality of second alternating ridges and grooves spaced radially and shaped to interface with said first alternating ridges and grooves of said first locating feature to radially secure said diaphragm plate to said annular inner section of said diaphragm;
   a relief valve having a shaft extending through said diaphragm and a head disposed on one side of said diaphragm; and
   a spring retainer disposed on an opposed side of said diaphragm from said head and about said shaft and having a bottom surface to contact said diaphragm plate and a portion extending from said bottom surface to contact said diaphragm between said first locating feature and said second locating feature.

4. A pressure regulator as set forth in claim 3 wherein said first locating feature is formed on an upper surface of said annular inner section and said second locating feature is formed on a lower surface of said diaphragm plate.

5. A pressure regulator as set forth in claim 3 wherein said diaphragm plate substantially covers an upper surface of said annular inner section of said diaphragm.

6. A pressure regulator comprising:
   a housing having an upper housing portion and a lower housing portion and defining an inlet and an outlet, said lower housing portion including a plurality of protrusions and a lower chamber surface;
   a diaphragm having an annular inner section, a flexible connecting section connected to said annular inner section, and an outer lip connected to said flexible connecting section and captured between said upper housing portion and said lower housing portion, said diaphragm defining a central bore and including a plurality of first alternating ridges and grooves spaced radially;

a diaphragm plate disposed adjacent said diaphragm including a plurality of second alternating ridges and grooves spaced radially and shaped to interface with said first alternating ridges and grooves; and a relief valve having a shaft disposed through said central bore and a head disposed vertically between said diaphragm and said protrusions, said head extending radially from said shaft and having an outer periphery sized to extend beyond a diameter of said central bore and overlapping said protrusions and contact a bottom surface of said annular inner section opposite said diaphragm plate with a portion of said diagram disposed between said head and said diaphragm plate and configured to suspend said annular inner section of said diaphragm in said housing above said lower chamber surface when no pressurized fluid is present at said inlet.

7. A pressure regulator as set forth in claim 6 including a spring retainer disposed on an opposed side of said diaphragm from said head and about said shaft and having a bottom surface to contact said diaphragm plate and a portion extending from said bottom surface to contact said diaphragm between said first alternating ridges and grooves and said second alternating ridges and grooves, a relief spring disposed about said shaft and contacting said spring retainer, a regulator spring disposed about said relief spring and said shaft and contacting said spring retainer, and a spring adjuster engaging said upper housing portion and contacting said regulator spring to control an output pressure of said relief valve.

8. A pressure regulator comprising:
a housing having upper and lower housing portions defining an inlet and an outlet, said housing defining a valve seat surrounding a passageway in communication with said inlet;
a diaphragm captured between said upper and lower portions to define upper and lower pressure chambers;
a relief valve extending through said diaphragm;
a valve body disposed in said passageway and movable between a plurality of operational positions including an open position spaced from said valve seat and a closed position in contact with said valve seat;
said valve body including a pocket and a spring disposed in said pocket;
a lever coupled to said relief valve for operatively coupling said diaphragm to said valve body; and
a driving pin being non-fixedly located in a recess of said valve body and said valve body being pivoted about said driving pin by said spring to provide an off-axis force against said valve body.

9. A pressure regulator comprising:
a housing having upper and lower housing portions defining an inlet and an outlet, said housing defining a valve seat surrounding a passageway in communication with said inlet;
a diaphragm captured between said upper and lower portions to define upper and lower pressure chambers;
a valve body disposed in said passageway and movable between a plurality of operational positions including an open position spaced from said valve seat and a closed position in contact with said valve seat;
said valve body including a pocket and a spring disposed in said pocket;
a lever operatively coupling said diaphragm to said valve body;
a driving pin being non-fixedly located in a recess of said valve body and said valve body being pivoted about said driving pin by said spring to provide an off-axis force against said valve body; and
wherein said spring has one end that abuts said valve body and an opposing end engaged by said lever.

10. A pressure regulator comprising:
a housing having upper and lower housing portions defining an inlet and an outlet, said housing defining a valve seat surrounding a passageway in communication with said inlet;
a diaphragm captured between said upper and lower portions to define upper and lower pressue chambers;
a valve body disposed in said passageway and movable between a plurality of operational positions including an open position spaced from said valve seat and a closed position in contact with said valve seat;
said valve body including a pocket and a spring disposed in said pocket;
a lever operatively coupling said diaphragm to said valve body;
a driving pin being non-fixedly located in a recess of said valve body and said valve body being pivoted about said driving pin by said spring to provide an off-axis force against said valve body; and
wherein said pocket is offset from a central axis of said valve body.

11. A pressure regulator as set forth in claim 8 wherein said valve body has a plurality of radially-extending spacers that centrally align said valve body in said passageway.

12. A pressure regulator as set forth in claim 8 including a valve carried by said valve body for engagement with said valve seat in a closed position thereby preventing the flow of fluid from the inlet to said passageway and spaced from said valve seat in an open position thereby allowing flow of fluid from the inlet through said passageway and into said lower pressure chamber.

13. A pressure regulator as set forth in claim 8 including a plunger having a first end positioned inside said spring located in said pocket and said spring having one end that abuts said valve body and an opposing end engaged by said plunger.

14. A pressure regulator as set forth in claim 8 including a relief valve having a shaft extending through said diaphragm and a head connected to said shaft.

15. A pressure regulator as set forth in claim 14 including a support integrally formed with said lower housing portion to contact a bottom surface of said head, a spring retainer disposed about said shaft, a regulator spring disposed about said relief spring and said shaft and contacting said spring retainer, and a spring adjuster engaging said upper housing portion and contacting said regulator spring to control an output pressure of said relief valve.

16. A pressure regulator as set forth in claim 14 wherein said lower housing portion defines a plurality of arcuate recesses that act as support surfaces integrally formed therewith and said support surfaces contact a bottom surface of said head before any fluid enters through said inlet.

* * * * *